Nov. 21, 1950     R. E. GEARHART     2,530,763
SCREW GRIPPING SCREW DRIVER
Filed Aug. 10, 1946
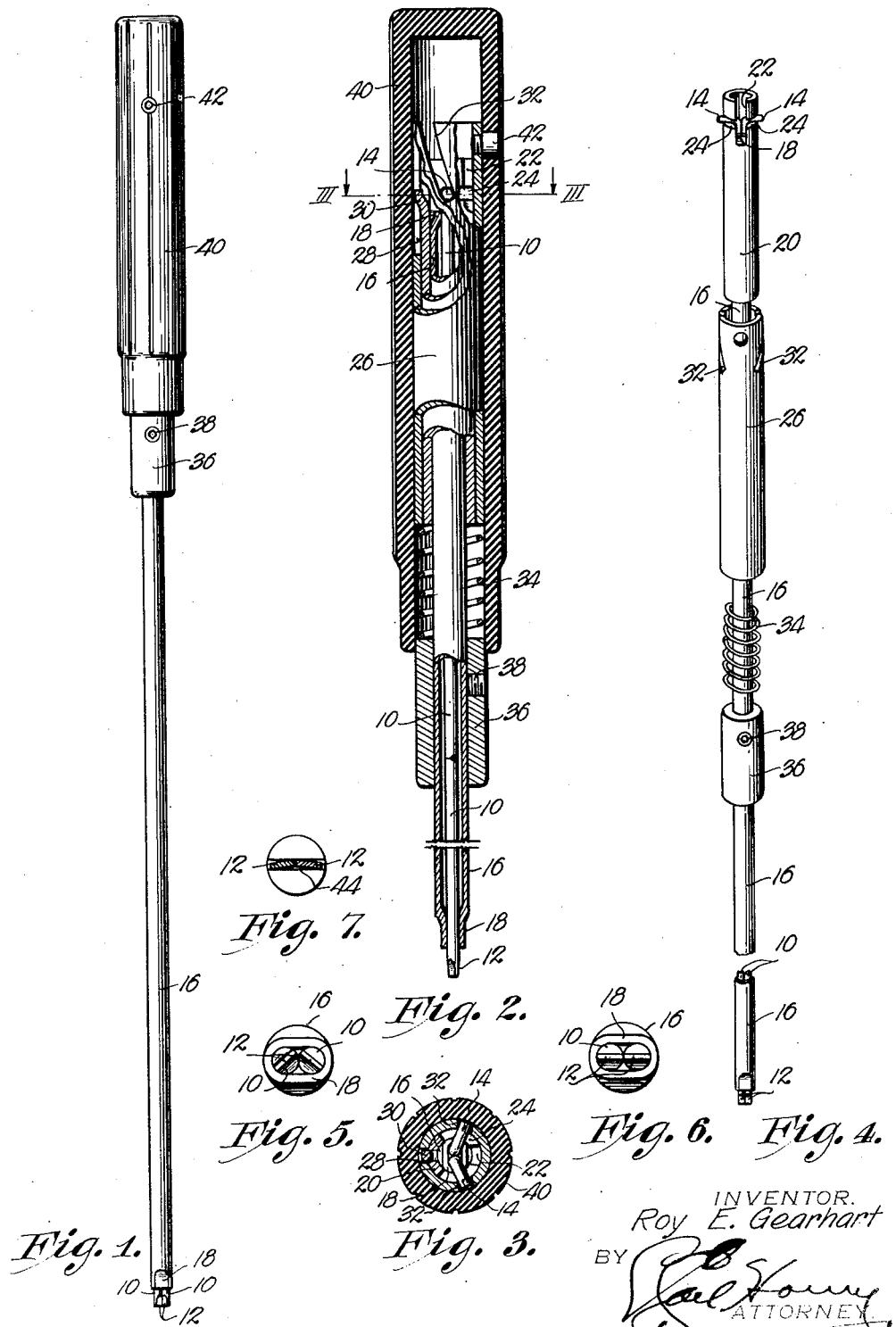
INVENTOR.
Roy E. Gearhart
BY
ATTORNEY Patented Nov. 21, 1950

2,530,763

UNITED STATES PATENT OFFICE 2,530,763

SCREW GRIPPING SCREW DRIVER

Roy E. Gearhart, Kansas City, Mo., assignor to Herbert H. Twente, Independence, Mo.

Application August 10, 1946, Serial No. 689,691

10 Claims. (Cl. 145—50)

This invention relates to hand tools and more particularly to screw drivers or holders of the type having provisions for holding or grippping screws.

The present invention is similar to one form of holder shown and described in my copending application Serial No. 669,312, now abandoned, but constitutes an improvement over the former holder in that two gripping members instead of one are employed with the result that a screw is held more firmly and in more direct alignment with the tool.

An important object of the invention is to provide a holder wherein the gripping members are readily manipulatable by the same hand used for holding the tool, thus leaving the remaining hand free for other operations.

A further aim of this invention is to provide a holder free from projecting parts which might interfere with use of the tool in complicated and highly condensed machines.

Another object of the invention is the provision of a holder wherein broken gripping members may be readily replaced by inexperienced workmen.

Further objects of the invention will become apparent during the course of the following specification, reference being had to the accompanying drawings, wherein:

Figure 1 is a side elevational view of a holder constructed in accordance with my invention.

Fig. 2 is an enlarged, condensed central, longitudinal section of the holder, parts being left in elevation to more clearly disclose the construction of the tool.

Fig. 3 is a cross section taken on the line III—III of Fig. 2.

Fig. 4 is a perspective view of the screw-holder parts shown in disassembled relation, the handle being omitted in this view.

Fig. 5 is an enlarged end elevational view showing the normal position of the gripping member blades.

Fig. 6 is a similar view of the blades in aligned relation for entering the slot of a screw, and Fig. 7 is an elevational view of a screw head showing the holder blades in position therein for gripping the screw.

Referring in more detail to the drawings:

The screw holder includes a pair of gripping members 10 each comprising a shaft having a blade portion 12 on one end and a lateral projection 14 on the opposite end thereof respectively. Gripping members 10 are held in parallel side-by-side relation by a tubular member 16 which is somewhat shorter than the shafts to expose both blade portions 12 and projections 14 at opposite ends of the member 16. As is clearly shown in the drawings, the ends of tubular member 16 are flattened as at 18 to accurately guide the gripping members 10.

Fixed in any suitable manner on one end of member 16 and extending therebeyond is an elongated collar 20 in the free end of which is formed a longitudinally directed slot 22 intersected by a radially disposed slot 24 extending to opposite sides of slot 22. Thus, gripping members 10 are threaded through the tubular member 16, and their lateral projections 14 pass through slot 22 into their respective slots 24.

A sleeve 26, having a diameter to snugly slide over collar 20, is provided at one end with a longitudinally disposed slot 28 shown in Figs. 2 and 3 for slidably receiving a struck-out protrusion 30 formed in collar 20. With this provision sleeve 26 is held against rotational movement on collar 20 but is free to move longitudinally thereon through a limited amount of travel. Provided also in sleeve 26 on opposite sides of slot 28 are angularly or diagonally extending slots 32, each receiving one of the lateral projections 14.

It will be clear from the foregoing that longitudinal movement of sleeve 26 on collar 20 results in partial rotation of gripping members 10. In the present illustrated embodiment of the invention a spring 34, interposed between sleeve 26 and a stop member 36 adjustably secured as at 38 on tubular member 16, serves to move sleeve 26 toward the outer end of collar 20, thereby normally maintaining the blade portions 12 in angular relation to each other.

A hollow handle 40, which in turn is secured as by screw 42 onto sleeve 26 provides means for compressing spring 34 and moving sleeve 26 in the opposite direction to align blade portions 12. This movement can be easily accomplished with one hand by holding the handle in the palm of the hand and drawing stop member 36 into the handle with the thumb and index finger.

It has been found that a screw holder constructed as shown and described is more practical than any heretofore available. As may be noted from Fig. 7 of the drawings there are four points of gripping contact of the holder with the walls of the screw slot 44. The screw is thereby held with extreme firmness and there is a tendency of the screw to remain in direct alignment with the longitudinal axis of the holder.

Should excessive torsional strain on the holder cause breakage of a gripping member, it may readily be replaced upon removing handle 40 and releasing pressure of spring 34 by positioning stop member 36 nearer the blade end of the holder.

From the foregoing it will be apparent that the objects of this invention have been accomplished and while it is possible that modifications of the holder might be made without departing from the spirit of the invention, it is desired to be limited only by the scope of the appended claims.

Having thus described the invention, what is claimed as new and desired to be secured by Letters Patent is:

1. A screw holder comprising a pair of shafts each having a blade portion on one end and a lateral projection on its opposite end, said blade portions terminating in substantially the same plane; a tubular member for supporting said shafts for oscillatory movement in parallel relation with each other said tubular member having flattened ends to guide said shafts; a collar fixed on one end of the tubular member, said collar having circumferentially extending slots for passage therethrough of said projections; a sleeve longitudinally movable over said collar and having angularly disposed slots for receiving said lateral projections to effect partial rotation of the shafts upon longitudinal movement of the sleeve on said collar; a spring for moving the sleeve in one direction; and a handle fixed to the sleeve for manual movement of the sleeve in the opposite direction.

2. A screw holder comprising a pair of shafts each having a blade portion on one end and a lateral projection on its opposite end, said blade portions terminating in substantially the same plane; a tubular member for supporting said shafts for oscillatory movement in parallel relation with each other said tubular member having guide means at its ends for said shafts; a collar fixed on one end of the tubular member, said collar having circumferentially extending slots for passage therethrough of said projections; a sleeve longitudinally movable over said collar and having angularly disposed slots for receiving said lateral projections to effect partial rotation of the shafts upon longitudinal movement of the sleeve on said collar; interengaging means on the collar and sleeve to prevent rotation of the sleeve on the collar; a spring for moving the sleeve in one direction; and a handle fixed to the sleeve for manual movement of the sleeve in the opposite direction.

3. A screw holder comprising a pair of shafts each having a blade portion on one end and a lateral projection on its opposite end, said blade portions terminating in substantially the same plane; a tubular member for supporting said shafts for oscillatory movement in parallel relation with each other said tubular member being of a length substantially equal to the length of the shafts between said blade portions and the lateral projections, said tubular member having guide means at its ends for said shafts; a collar fixed on one end of the tubular member, said collar having circumferentially extending slots for passage therethrough of said projections; a sleeve longitudinally movable over said collar and having angularly disposed slots for receiving said lateral projections to effect partial rotation of the shafts upon longitudinal movement of the sleeve on said collar; said sleeve having a longitudinally disposed slot and said collar having a lateral protrusion for riding in said slot; a spring for moving the sleeve in one direction; and a handle fixed to the sleeve for manual movement of the sleeve in the opposite direction.

4. A screw holder of the kind described comprising an open-ended tubular shaft; a pair of substantially identical gripping members in the shaft in side-by-side relation to each other and extending from one end thereof, at least one of said members being mounted for oscillatory movement in the shaft; slot-engaging blade portions formed on the extended end of each member respectively; and structure having manually manipulable parts for actuating said oscillatable member for moving the blade thereof to and from a position in alignment with the blade of the other member.

5. A screw holder comprising a pair of gripping members each having a screw slot engaging blade portion on one end, said blade portions terminating in substantially the same plane; means for supporting said members for oscillatory movement in side-by-side relation; spring-loaded means operably connected with said members for normally holding the blade portions out of alignment with each other for gripping a screw; and manually operable means acting on said spring-loaded means against the action of said spring for moving the members to align said blade portions for entering the slot of the screw.

6. A screw holder comprising a pair of rectilinear shafts each having a blade portion on one end, said blade portions terminating in substantially the same plane; means for supporting said shafts for oscillatory movement in side-by-side relation; spring-loaded means operably connected with said shafts for normally holding the blade portions in angular relation to each other for gripping a screw; and manually operable means acting on said spring-loaded means against the action of said spring for turning the shafts in opposite directions to align said blade portions for entering the slot of a screw.

7. A screw holder comprising a pair of rectilinear shafts each having a blade portion on one end and a lateral projection on its opposite end, said blade portions terminating in substantially the same plane; means for supporting said shafts for oscillatory movement in side-by-side relation; spring-loaded means operably connected with said lateral projections for normally holding the blade portions out of alignment with each other for gripping a screw; and manually operable means acting on said spring-loaded means against the action of said spring for moving the shafts to align said blade portions for entering the slot of the screw.

8. A screw holder comprising a pair of shafts each having a blade portion on one end and a lateral projection on the opposite end, said blade portions terminating in substantially the same plane; a tubular member for supporting said shafts for oscillatory movement in parallel relation with each other, said tubular member being of a length to substantially extend from the blade portions of the shafts to said lateral projections; spring-loaded means operably connected with said lateral projections for normally holding the blade portions in angular relation to each other for gripping a screw; and manually operable means acting on said spring-loaded means against the action of said spring for turning the shafts in opposite directions to align said blade portions for entering the slot of a screw.

9. A screw holder comprising a pair of shafts each having a blade portion on one end and a lateral projection on its opposite end, said blade portions terminating in substantially the same plane; a tubular member of a length to support substantially the entire portion of said shafts between said blade portions and the lateral projections for oscillatory movement of the shafts in parallel relation with each other; a sleeve surrounding said tubular member and having angularly disposed slots for receiving said lateral projections to effect partial rotation of the shafts upon longitudinal movement of the sleeve on said tubular member, said sleeve being in snug sliding relation with the tubular member; a spring for moving the sleeve in one direction; and a handle fixed to the sleeve for manual movement of the sleeve in the opposite direction.

10. A screw holder comprising a pair of shafts each having a blade portion on one end and a lateral projection on its opposite end, said blade portions terminating in substantially the same plane; a tubular member of a length to support said shafts throughout substantially their entire lengths between the blade portions and said lateral projections for oscillatory movement of the shafts in parallel relation with each other; a sleeve snugly and slidably surrounding said tubular member and having angularly disposed slots for receiving said lateral projections to effect partial rotation of the shafts upon longitudinal movement of the sleeve on said tubular member; a stop on said tubular member; a spring interposed between the stop and sleeve for moving said sleeve in one direction; and a handle surrounding the sleeve and fixed thereto for movement of the sleeve in the opposite direction.

ROY E. GEARHART.

REFERENCES CITED

The following references are of record in the file of this patent:

UNITED STATES PATENTS

| Number | Name | Date |
|---|---|---|
| 2,040,723 | Adison | May 12, 1936 |
| 2,324,153 | Hagness | July 13, 1943 |

FOREIGN PATENTS

| Number | Country | Date |
|---|---|---|
| 224,028 | Great Britain | Nov. 8, 1924 |
| 710,431 | France | June 8, 1931 |
| 826,059 | France | Dec. 27, 1937 |